United States Patent

Merz

[11] Patent Number: 5,922,232
[45] Date of Patent: Jul. 13, 1999

[54] SELF-REGULATING HEATING ELEMENT

[75] Inventor: Rolf Merz, Besigheim, Germany

[73] Assignee: Beru AG, Ludwigsburg, Germany

[21] Appl. No.: 09/031,056

[22] Filed: Feb. 26, 1998

[30] Foreign Application Priority Data

Feb. 26, 1997 [DE] Germany .......................... 197 07 764

[51] Int. Cl.⁶ ...................................... H05B 1/02
[52] U.S. Cl. ..................... 219/505; 219/523; 219/530; 338/22 R
[58] Field of Search ...................... 219/553, 504, 219/505, 523, 483–486, 530; 338/22 R, 23

[56] References Cited

U.S. PATENT DOCUMENTS

| | | |
|---|---|---|
| 3,067,311 | 12/1962 | Lacy-Hulbert . |
| 3,916,264 | 10/1975 | Berg ........................................ 338/22 R |
| 4,733,053 | 3/1988 | Mueller ..................................... 219/523 |
| 5,091,631 | 2/1992 | Dupuis et al. . |
| 5,166,658 | 11/1992 | Fang et al. ................................ 338/23 |

FOREIGN PATENT DOCUMENTS

| | | |
|---|---|---|
| 0 616 486 | 9/1994 | European Pat. Off. . |
| 38 25 013 | 1/1990 | Germany . |

*Primary Examiner*—Mark Paschall
*Attorney, Agent, or Firm*—Sixbey, Friedman, Leedom & Ferguson; David S. Safran

[57] ABSTRACT

Self-regulating heating element for heating a gaseous flowing medium with a strip conductor (1) and a control conductor (2) which are electrically connected to one another in series and are in thermal contact with one another over their length, but which are electrically insulated from one another. The Control conductor (2) is preferably formed of a jacketed conductor with a metallic jacket which is electrically connected to the strip conductor (1).

12 Claims, 2 Drawing Sheets

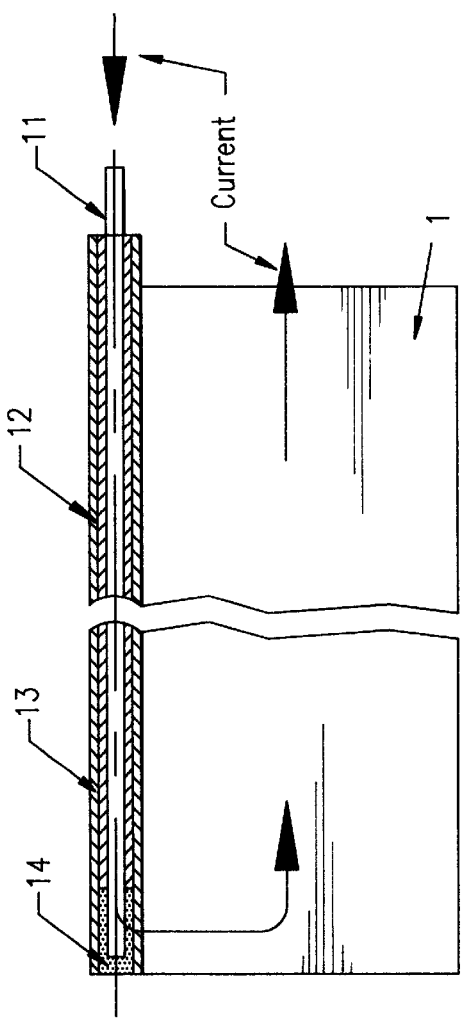
FIG. 3
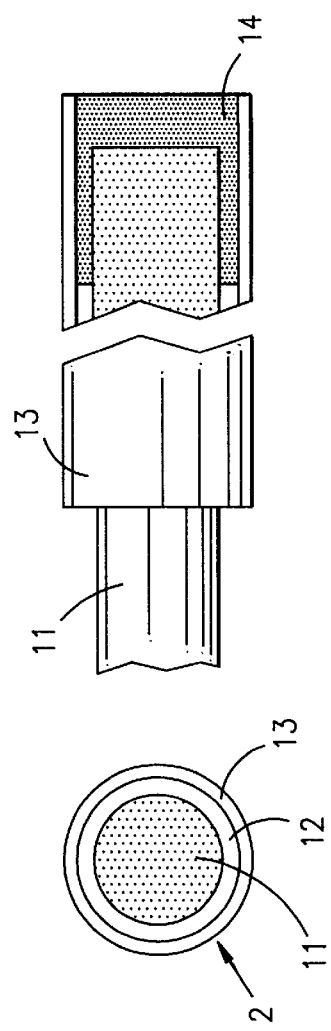
FIG. 4B
FIG. 4A
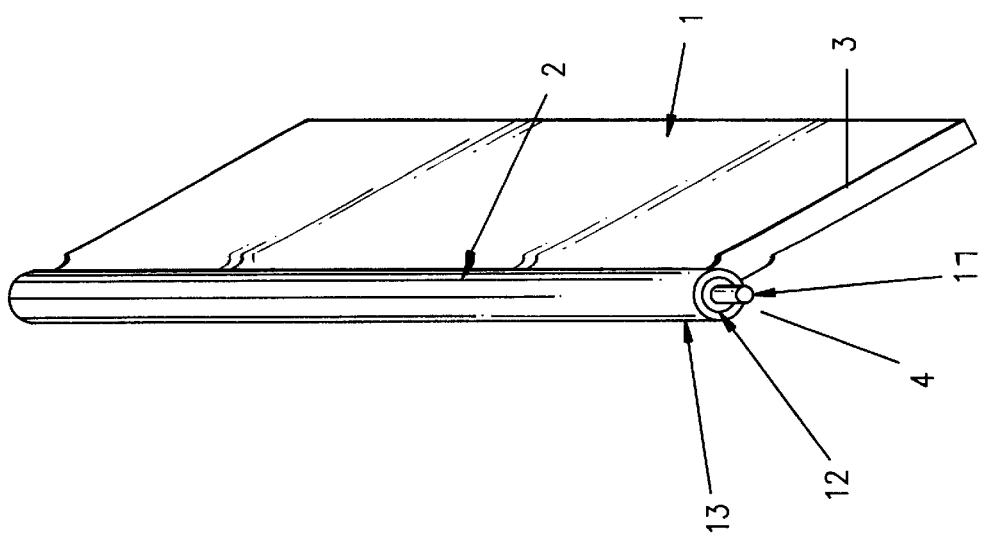
FIG. 2

SELF-REGULATING HEATING ELEMENT

BACKGROUND OF THE INVENTION

1. Field of the Invention

The invention relates to a self-regulating heating element for heating a gaseous flowing medium.

2. Description of Related Art

A heating element of the type to which this invention is directed exhibits a strong relationship between the temperature and the electrical resistivity and is used, for example, for electrical heating furnaces and electric driers, and especially, for intake air preheating in internal combustion engines. To preheat the intake air in internal combustion engines, the heating element is installed in a so-called heating flange in the intake duct of the internal combustion engine.

The known self-regulating heating elements for heating of flowing gaseous media of published European Patent Application No. 0 616 486 A1 uses barium titanate ceramics ($BaTiO_3$) with varied doping as the heating source. In a temperature window from 30 to 40° K, these ceramics exhibit a steep rise of electrical resistivity. Depending on the doping, this range can be, for example, between 220 and 250° C. Thus, ceramic temperatures up to a maximum 250° C. can be attained. The heat is released to the gaseous media by heat transfer members, for example, formed of metal strips bent back and forth in a zig-zag or meander manner, which are in contact with the barium titanate ceramic heating elements and which then have a surface temperature of 80 to 120° C. However, at high flow velocities, for example, in intake air preheating in internal combustion engines, for better heat transfer, a larger temperature difference between the heating element surface and the gaseous medium is necessary. Moreover, Barium titanate ceramics have the disadvantage that they are costly.

Non-selfregulating heating elements for heating of flowing gaseous media are also known in which a metal with relatively high electrical resistivity and good resistance to scale, for example, a CrFeAl alloy, is used. These heating elements reach high temperatures, but have very long heat-up times. This also applies to heating elements which are not externally controlled. However, external controls, for example, in the form of pulse width modulation, are associated with relatively high costs.

The problem of building self-regulating heating elements consists, moreover, in that the heat conductors with high control or regulation properties are extremely susceptible to corrosion.

SUMMARY OF THE INVENTION

A primary object of the invention is to devise a self-regulating heating element for heating of a gaseous flowing medium having at least one control conductor with a positive temperature coefficient of its resistivity, which can be heated to a high temperature, and which, in this way, has a high control factor and good heat transfer to the gaseous medium which is flowing past.

This object is achieved in accordance with the present invention by at least one strip-shaped conductor with an electric resistance that is essentially independent of temperature, which is electrically connected in series to at least one control conductor and is thermally coupled over its length to the control conductor, but is electrically insulated from it.

In a heating element of this type, the control conductor is the part which has the highest temperature over the entire operating interval, with the exception of the first 1 or 2 seconds after being turned on. The temperature of the control conductor is determined by its inherent heating. Here, rapid inherent heating is desirable since this shortens the glow time. High power consumption during starter actuation after the preheat phase is conversely undesirable, since this reduces the starter rpm and thus the willingness of the engine to start. Therefore, to heat up quickly, the heating element must draw an initial current which is much higher as compared to the normal power consumption, this high power consumption dropping back to the normal value after a short time, i.e. after 3 to 60 seconds, preferably 3 to 10 seconds.

To achieve a high overall control factor of the heating element, i.e. a high quotient of the initial current and the stationary current, the control conductor in the steady state must provide for the maximum resistance component of the series connection of the control conductor and strip-shaped conductor. The resistance portion in the steady state without an air flow is especially at least 70%, and in control conductors with control factors of more than 10, preferably more than 80%. Therefore, most of the heat generated occurs on the control conductor.

Since, to achieve a high control factor, the control conductor must be heated to very high temperatures of more than 1000° C., due to the high power consumption of the control conductor in the steady state, an efficient heat-conducting connection to the strip-shaped conductor is necessary. Because the strip-shaped conductor exhibits only low heat generation relative to its surface and has a low temperature, thermal energy flows by heat conduction into the strip-shaped conductor from the control conductor. On the one hand, the strip-shaped conductor protects the control conductor from overheating, and on the other hand, it improves the heat release to the air flow.

On the series connection of the control conductor and the strip-shaped conductor, the strip-shaped conductor has essentially only one electrical function as a constant resistance, preferably as a series resistor, to limit the current at turn-on. To achieve high starting performance for rapid heating of the heating element, the control conductor must have very low resistance at the start of the heat-up phase. However, since its resistance in the steady state increases strongly, it is a good idea to ensure the minimum resistance of the heating element by a constant resistance, for example, by the strip-shaped conductor.

The existence of a temperature gradient within the strip-shaped conductor, i.e. the temperature which decreases in the direction to the side facing away from the control conductor, can be used as attachment of the heating element since the temperature of the heating element, for a sufficient strip width of the strip-shaped conductor, decreases to an extent that attachment with a duroplastic with a continuous operating temperature of, for example, roughly 300° C., becomes possible. Thus, a ceramic support insulator is no longer necessary.

If, in particular, the control conductor is made as a sheathed conductor, corrosion susceptibility is greatly reduced since the actual control wire is protected against the medium to be heated by the metal sheath. If the control conductor is made in the form of a sheathed conductor, it can thus be placed directly into the medium to be heated. In doing so, good heat transfer between the control wire and the ambient medium is ensured, via the metallic sheath, by means of the insulating layer provided in between. Furthermore, a sheathed conductor is easily shaped so that there is extensive freedom in the construction.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIG. 2 is an enlarged perspective view of the portion of the heating element at the connection end shown at the right in FIG. 1;

FIG. 3 shows a partially cut-away side view of the heating element;

FIG. 4A is a cross-sectional view of a control conductor in the form of a sheathed conductor; and FIG. 4B shows a partial longitudinal section of the control conductor of FIG. 4A on the end of the contact.

DETAILED DESCRIPTION OF THE PREFERRED EMBODIMENT

Figure 1:
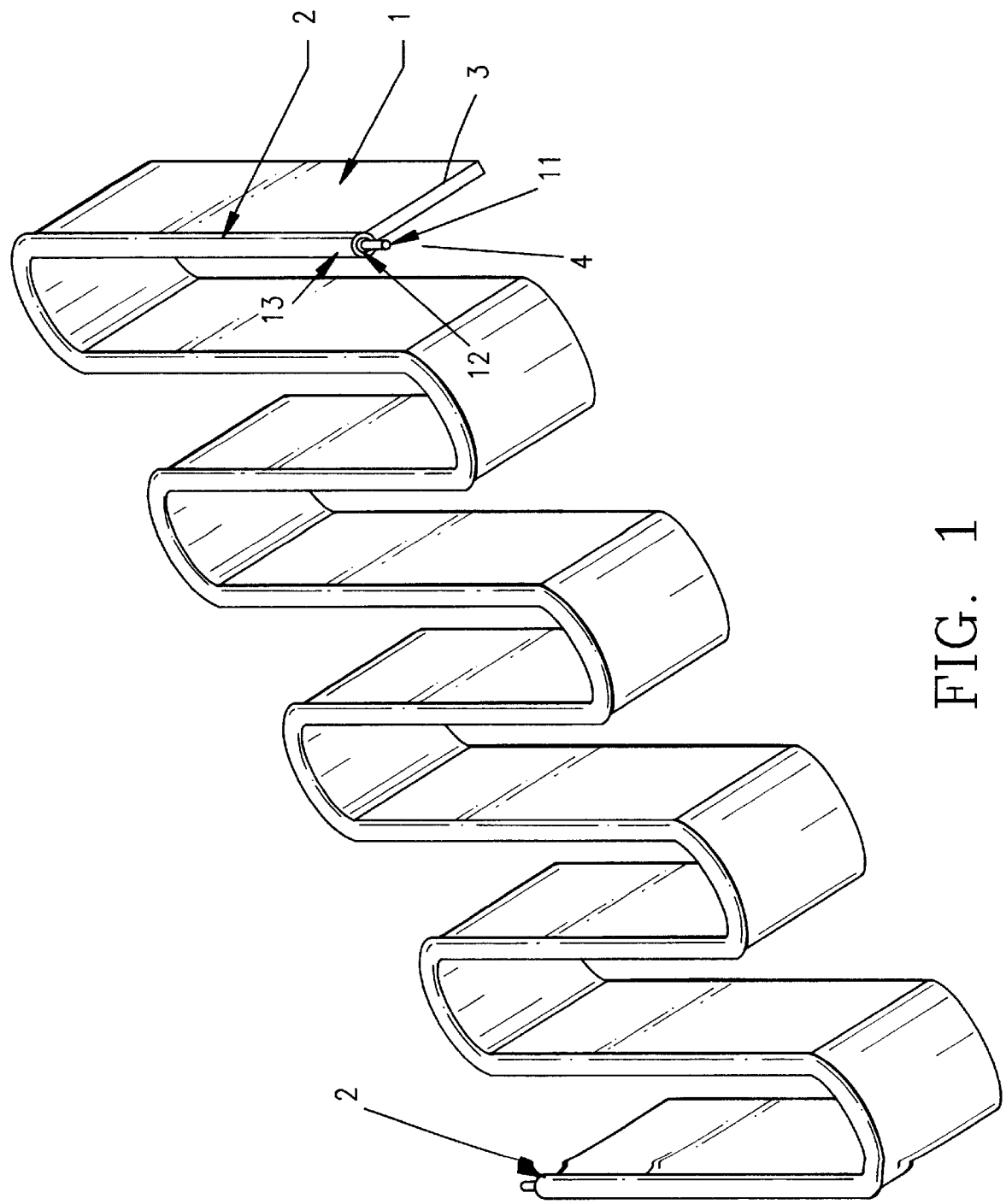
FIG. 1 is a perspective view of a self-regulating heating element in accordance with the present invention.

The self-regulating heating element shown in FIG. 1 for heating a gaseous flowing medium comprises a strip conductor 1 without a thermal control property, i.e. of a material without or with only a low temperature dependency of its electrical resistivity. The strip conductor 1 is formed of a strip bent in a serpentine or meander shape, and is thermally coupled to a control conductor 2 of a material having a positive temperature coefficient of electrical resistivity, but which is electrically insulated from it along its length. As represented in FIG. 1, the control conductor 2 in the form of a wire is welded or soldered to one edge of the strip conductor 1.

Control conductor 2 and strip conductor 1 are electrically connected in series to one another by control conductor 2 being joined electrically conductively to strip conductor 1 on the end opposite the electrical terminals 3 and 4 made, respectively, on one end of the strip conductor 1 and control conductor 2.

The ratio of the electrical resistance of control conductor 2 to the electrical resistance of strip conductor 1 is of great importance. With a control conductor 2 having a high control factor, strip conductor 1 forms a series resistance which is series connected to control conductor 2. As a result of the low resistivity of control conductor 2 with a high control factor at room temperature, strip conductor 1 is used to limit the turn-on current, the dimensioning of the cross sectional surface, length, position of the electrical contact and also the choice of material are available as variables.

The resistance of strip conductor 1, when the control conductor 2 with a high control factor exceeding 7 is used at temperatures from 0 to 1000° C., corresponds at least to the cold resistance of the control conductor 2. When control conductors are used which have a control factor of more than 10 (0 to 1000° C.), the resistance of strip conductor 1 is preferably at least twice the cold resistance of control conductor 2.

Thus, in the steady state, the resistance component of the control conductor 2 of the series connection of strip conductor 1 and control conductor 2 is at least 70%, preferably more than 80% in control conductors with a control factor of greater than 10. Control conductor 2 is thus the element which is predominantly responsible for the formation of heat on the heating element. Some of this heat produced on control conductor 2 is released to strip conductor 1 by heat conduction.

As is shown in FIG. 4A, control conductor 2 is made preferably in the form of a sheathed conductor with control wire 11 made of a material with a control factor of more than 7 in a temperature range of 0 to 1000° C., preferably of Fe, Ni, a Ni, Fe or CoFe alloy with a control factor of more than 10, which is electrically insulated but thermally coupled via a ceramic insulating layer 12 made, for example, of MgO, and which is located in a metal sheath 13 made, for example, of a CrNi alloy. Here, the length of the control conductor is large when compared to its diameter.

As is shown in FIG. 4B, electrical contact between the control conductor 2 and strip conductor 1 on the end opposite the electrical terminals 3, 4 is established by metal sheath 13 being electrically connected to the control wire 11 on one end via one connection site 14, so that control wire 11 is electrically connected via sheath 13 to strip conductor 1 which is welded or soldered to it. Connection site 14 is made such that there is large-area passage of electrical current to sheath 13 with an electric resistivity which is high as compared to control wire 11 in order to prevent partial overheating of sheath 13. Here, the contact between the control wire 11 and sheath 13 can be improved, for example, by ceramic insulating layer 12 being removed in the contact area and sheath 13 being brought into contact with control wire 11.

As is shown in particular in FIG. 2, electrical terminal 3 is on strip conductor 1 and electrical terminal 3 is on control conductor 2, especially on control wire 11 of control conductor 2 made as a sheathed conductor. To do this, the control wire 11 is joined, for example, to a terminal wire preferably of copper, while strip conductor 1 has a welded-on terminal stud, or is provided with a molded-on plug connection.

In the aforementioned design, control conductor 2 is thus in good thermal contact over its entire length with strip conductor 1, but is electrically insulated from it except at site 14. If sheath 13 of control conductor 2 which is made as a sheathed conductor consists of a chromium-nickel alloy, corrosion resistance is exceptionally good.

Electrical contact of control wire 11 with sheath 13 and with strip conductor 1 can be achieved not only by soldering and welding, but also by caulking and so forth.

In addition to limiting the turn-on current of the heating element by using it as a series resistor to the control conductor, strip conductor 1 is also designed to mechanically fix control conductor 2 made as a sheathed conductor, since a sheathed conductor does not have sufficient inherent stiffness especially at high temperatures due to its geometry.

In the steady state, the resistance component of control conductor 2 of the series connection of strip conductor 1 and control conductor 2 is at least 70%, as was mentioned above. This results in heating of control conductor 2 made as a sheathed conductor to more than 1000° C. The associated decrease of the strength of metallic components for a sheathed conductor without a strip conductor would necessarily lead to destruction by its inherent weight or by vibration loads.

The material of strip conductor 1 is, however, at a much lower temperature, except in the area where it connects to the sheathed conductor. This leads to a higher strength in strip conductor 1 so that, via the connection to the sheathed conductor, it can support the latter over its length.

By heat-conductive coupling between strip conductor 1 and control conductor 2 made as a sheathed conductor thermal relief over the entire length is achieved. In particular, this means that, to achieve rapid and clear regulation of the heating element, core wires 11 of the sheathed conductor with a high control factor are used. To achieve corresponding control factors, these conductors must be heated to a high temperature of more than 1000° C. Thus, in the down-regulated state, resistance ratios arise in which the resistance portion, and thus the energy portion of the control conductor on the series connection, is at least 70% in the aforementioned manner. Based on the smaller surface of the sheathed conductor it would glow away, if the thermally conductive connection between control conductor 2 and strip conductor 1 would not enable discharge of some of the corresponding heat into the strip material of strip conductor 1.

Strip conductor 1 has the additional function of improving heat transfer between its large surface and the surrounding air flow.

The heating element is thus characterized by the fact that, after starting, power consumption which is greatly increased relative to the steady state prevails. The turn-on current is preferably 3 to 7 times greater than the power consumption in the steady state. After starting, the power consumption drops back continually to the steady-state value due to the inherent heating of the control conductor. The time interval of increased power consumption after starting is less than 60 seconds, preferably less than 20 seconds. This is necessary to limit the preheat time, for example in diesel engines, since increased power consumption would lead to a drop of the starter rpm and thus to a worsened starting capacity of the motor when the starter is started at the same time.

There can be several control conductors and several strip conductors which are connected in series or parallel to one another. Mixed circuit forms are also possible. If, for example, the control conductor is located between two strip conductors, it is bilateral, i.e. continuously welded or soldered radially at two points in the longitudinal direction to the two strip conductors.

In a self-regulating heating element with the structure described above, depending on the design, temperatures of up to 1200° C. can be reached within a short time; this offers a decisive advantage as compared to heating elements based on barium titanate ceramics with an operating temperature up to a maximum of 250° C. If this heating element is used for intake air preheating of an internal combustion engine, it is exposed directly to air, preferably in the intake area of the internal combustion engine. By making the control conductor in the form of a sheathed conductor with corrosion protection by the sheath made, for example, of a chromium-nickel alloy, this arrangement of the heating element is possible without the risk of high corrosion susceptibility of the heating element. This is possible by providing the control conductor on a sheathed conductor being corrosion protected by the sheath made, for example, from a chromium-nickel alloy without a risk of high corrodability of the heating element. Based on its execution from a control conductor and strip conductor in thermal contact with one another, at low temperatures in the starting phase, high starting currents, and at high temperatures and with stationary air, reduced power consumption, can be achieved with precooling. As a result, the electrical resistance of the control conductor increases so that the electric power consumed by the entire part decreases.

Since the heating element is self-regulating, an external control device is unnecessary, so that it is accordingly economical.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Self-regulating heating element for heating of a gaseous flowing medium comprising at least one control conductor with a positive temperature coefficient of resistivity, said at least one control conductor having a control factor which is defined as a fractional ratio between electrical current passing through said control conductor at an initial state of operation and electrical current passing through said control conductor during steady state operation, and at least one strip-shaped conductor with an essentially temperature-independent resistivity, said at least one strip-shaped conductor being electrically connected in series to said at least one control conductor and being thermally coupled along its entire length to said at least one control conductor in a manner to allow conductive heat transfer between said at least one control conductor and said at least one strip-shaped conductor while being electrically insulated relative thereto.

2. Heating element as claimed in claim 1, wherein said at least one control conductor is a sheathed conductor formed of a control wire which is located within a ceramic insulating layer in a metallic sheath, the metallic sheath being connected along its length to said at least one strip-shaped conductor.

3. Heating element as claimed in claim 2, wherein said at least one control wire is made of a material selected from the group consisting of Fe, Ni or a Ni, Fe or CoFe alloy, and has a control factor of more than 7.

4. Heating element as claimed in claim 2, wherein said at least one control conductor and strip-shaped conductor are electrically connected to one another by said sheath being electrically connected to the control wire on one end of the control conductor.

5. Heating element as claimed in claim 4, wherein said control factor of said at least one control conductor exceeds 7; and said at least one strip conductor has a resistance which is at least equal to a cold resistance of the at least one control conductor.

6. Heating element as claimed in claim 4, wherein said control factor of said at least one control conductor exceeds 10; and said at least one strip conductor has a resistance which is at least twice a cold resistance of the at least one control conductor.

7. Heating element as claimed in claim 1, wherein said at least one control wire is made of a material selected from the group consisting of Fe, Ni or a Ni, Fe or CoFe alloy, and has a control factor of more than 7.

8. Heating element as claimed in claim 3, wherein said at least one control conductor and strip-shaped conductor are electrically connected to one another by said sheath being electrically connected to the control wire on one end of the control conductor.

9. Heating element as claimed in claim 4, wherein said control factor of said at least one control conductor exceeds 7; and said at least one strip conductor has a resistance which is at least equal to a cold resistance of the at least one control conductor.

10. Heating element as claimed in claim 1, wherein said control factor of said at least one control conductor exceeds 7; and said at least one strip conductor has a resistance which is at least equal to a cold resistance of the at least one control conductor.

11. Heating element as claimed in claim 1, wherein said control factor of said at least one control conductor exceeds 10; and said at least one strip conductor has a resistance which is at least twice a cold resistance of the at least one control conductor.

12. Heating element as claimed in claim 1, wherein at least one of said at least one strip-shaped conductor and said at least one control conductor comprise partial conductors which are themselves connected in parallel.

* * * * *